(12) United States Patent
Karapantelakis et al.

(10) Patent No.: US 11,134,388 B2
(45) Date of Patent: Sep. 28, 2021

(54) METHOD AND DEVICES FOR HARDWARE IDENTIFIER-BASED SUBSCRIPTION MANAGEMENT

(71) Applicant: Telefonaktiebolaget LM Ericsson (publ), Stockholm (SE)

(72) Inventors: Athanasios Karapantelakis, Solna (SE); Ioannis Fikouras, Stockholm (SE); Rafia Inam, Västerås (SE); Qiang Li, Täby (SE); Leonid Mokrushin, Uppsala (SE); Maxim Teslenko, Sollentuna (SE); Konstantinos Vandikas, Solna (SE); Aneta Vulgarakis Feljan, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/626,733

(22) PCT Filed: Jun. 29, 2017

(86) PCT No.: PCT/EP2017/066162
§ 371 (c)(1),
(2) Date: Dec. 26, 2019

(87) PCT Pub. No.: WO2019/001717
PCT Pub. Date: Jan. 3, 2019

(65) Prior Publication Data
US 2020/0137567 A1 Apr. 30, 2020

(51) Int. Cl.
*H04W 12/06* (2021.01)
*H04W 12/08* (2021.01)
(Continued)

(52) U.S. Cl.
CPC ......... *H04W 12/71* (2021.01); *H04L 63/0876* (2013.01); *H04W 8/04* (2013.01);
(Continued)

(58) Field of Classification Search
CPC .................. H04W 12/06; H04W 8/183; H04W 12/04301; H04W 36/0066; H04W 8/186;
(Continued)

(56) References Cited

U.S. PATENT DOCUMENTS 6,665,529 B1 * 12/2003 Mills, Jr. ............... H04W 12/06
455/411
6,886,095 B1 * 4/2005 Hind ...................... H04W 12/06
713/168
(Continued)

FOREIGN PATENT DOCUMENTS

EP 2658301 A1 10/2013
GB 2506610 A * 9/2014 ............ H04W 76/02
(Continued)

OTHER PUBLICATIONS

"dHSS—Distributed Peer-to-Peer implementation of the LTE HSS based on the Bitcoin/Namecoin architecture ", Jover, et al. IEEE ICC2016—Workshops: W01—Third Workshop on 5G Architecture (5GArch 2016) May 2016 (Year: 2016).*
(Continued)

*Primary Examiner* — William D Cumming
(74) *Attorney, Agent, or Firm* — Baker Botts, LLP (57) ABSTRACT

Methods and devices enable connecting devices to cellular networks using the devices' hardware identifiers. Subscriber records include a hardware identifier assigned when the devices are manufactured. A target hardware identifier included in an attachment request is associated with an
(Continued)

International Mobile Subscriber Identity, IMSI, available to the cellular network if, according to subscriber records, the device is registered.

10 Claims, 10 Drawing Sheets

(51) Int. Cl.
| | |
|---|---|
| *H04W 48/02* | (2009.01) |
| *H04W 8/00* | (2009.01) |
| *H04W 4/70* | (2018.01) |
| *H04W 36/00* | (2009.01) |
| *H04W 12/71* | (2021.01) |
| *H04W 76/10* | (2018.01) |
| *H04L 29/06* | (2006.01) |
| *H04W 8/04* | (2009.01) |
| *H04W 8/18* | (2009.01) |
| *H04W 12/037* | (2021.01) |

(52) U.S. Cl.
CPC ........... *H04W 8/18* (2013.01); *H04W 12/037* (2021.01); *H04W 12/06* (2013.01); *H04W 76/10* (2018.02)

(58) Field of Classification Search
CPC . H04W 4/70; H04W 36/0038; H04W 68/005; H04W 36/005; H04W 48/02; H04W 12/08; H04L 63/08; H04L 63/105
USPC ..... 455/411, 410, 418, 436, 414.1; 370/328, 370/329
See application file for complete search history.

(56) References Cited

U.S. PATENT DOCUMENTS

| | | | | |
|---|---|---|---|---|
| 7,240,364 | B1* | 7/2007 | Branscomb | H04L 29/12113 726/5 |
| 7,313,384 | B1* | 12/2007 | Meenan | H04L 12/283 455/410 |
| 7,346,344 | B2* | 3/2008 | Fontaine | H04W 8/183 455/418 |
| 7,467,405 | B2* | 12/2008 | Cheng | G06F 21/33 726/10 |
| 7,499,438 | B2* | 3/2009 | Hinman | H04W 72/048 370/338 |
| 7,653,379 | B1* | 1/2010 | Meenan | H04L 12/283 455/410 |
| 7,916,707 | B2* | 3/2011 | Fontaine | H04W 8/183 370/338 |
| 7,986,938 | B1* | 7/2011 | Meenan | H04L 12/283 455/410 |
| 8,505,081 | B2* | 8/2013 | Hawkes | H04W 12/08 726/6 |
| 8,649,768 | B1* | 2/2014 | Gaddam | H04W 12/06 455/411 |
| 8,700,002 | B2* | 4/2014 | Lopez | H04W 68/005 455/411 |
| 8,775,632 | B2* | 7/2014 | Lim | H04L 67/14 709/227 |
| 8,929,865 | B2* | 1/2015 | Lopez | H04W 68/005 455/411 |
| 8,942,191 | B2* | 1/2015 | Nath | H04W 4/70 370/329 |
| 9,026,082 | B2* | 5/2015 | Lindholm | H04W 8/265 455/411 |
| 9,037,118 | B2* | 5/2015 | Gaddam | H04L 67/26 455/414.1 |
| 9,094,829 | B2* | 7/2015 | Chen | H04W 12/08 |
| 9,603,006 | B2* | 3/2017 | Evans | H04B 1/3816 |
| 9,686,675 | B2* | 6/2017 | Ketheesan | H04W 4/12 |
| 10,185,814 | B2* | 1/2019 | Davis | H04L 63/0861 |
| 10,198,729 | B2* | 2/2019 | Davis | G06Q 20/401 |
| 10,546,295 | B2* | 1/2020 | Davis | H04L 63/0861 |
| 10,606,989 | B2* | 3/2020 | Davis | G06Q 20/3229 |
| 10,681,672 | B2* | 6/2020 | Kasirajan | H04W 8/02 |
| 2004/0242197 | A1* | 12/2004 | Fontaine | H04W 8/183 455/411 |
| 2006/0047823 | A1* | 3/2006 | Cheng | G06F 21/33 709/229 |
| 2006/0104224 | A1* | 5/2006 | Singh | G07C 9/37 370/310 |
| 2006/0153122 | A1* | 7/2006 | Hinman | H04L 67/04 370/328 |
| 2007/0082654 | A1* | 4/2007 | Hovnanian | H04L 63/105 455/410 |
| 2007/0143483 | A1* | 6/2007 | Lim | H04L 67/14 709/227 |
| 2008/0216154 | A1* | 9/2008 | Fontaine | H04W 12/0431 726/3 |
| 2009/0054065 | A1* | 2/2009 | Voyer | H04W 36/0066 455/436 |
| 2011/0191835 | A1* | 8/2011 | Hawkes | H04W 12/08 726/6 |
| 2011/0268047 | A1* | 11/2011 | Nath | H04W 8/186 370/329 |
| 2012/0196570 | A1* | 8/2012 | Lindholm | H04W 12/06 455/411 |
| 2013/0060619 | A1* | 3/2013 | Davis | G06Q 20/102 705/14.23 |
| 2013/0060620 | A1* | 3/2013 | Davis | G06Q 30/00 705/14.23 |
| 2013/0061332 | A1* | 3/2013 | Davis | H04L 63/08 726/28 |
| 2013/0061333 | A1* | 3/2013 | Davis | G06F 21/316 726/28 |
| 2013/0072257 | A1* | 3/2013 | Evans | H04W 8/205 455/558 |
| 2013/0189951 | A1* | 7/2013 | Lopez | H04W 36/0038 455/411 |
| 2013/0254395 | A1* | 9/2013 | Chen | H04W 48/02 709/225 |
| 2014/0194097 | A1* | 7/2014 | Gaddam | H04W 12/06 455/411 |
| 2014/0219178 | A1* | 8/2014 | Lopez | H04W 36/0038 370/328 |
| 2015/0006898 | A1 | 1/2015 | Mizikovsky | |
| 2016/0174069 | A1* | 6/2016 | Bruner | H04L 63/065 455/411 |
| 2016/0295398 | A1* | 10/2016 | Ketheesan | H04W 4/12 |
| 2017/0194995 | A1* | 7/2017 | Evans | H04W 12/04 |
| 2018/0063813 | A1* | 3/2018 | Gupta | H04W 8/18 |
| 2018/0368100 | A1* | 12/2018 | Kasirajan | H04W 8/02 |
| 2020/0137567 | A1* | 4/2020 | Karapantelakis | H04W 8/18 |

FOREIGN PATENT DOCUMENTS

| | | | |
|---|---|---|---|
| JP | 2014519273 A * | 8/2014 | ............ H04W 8/18 |
| WO | 2007 052894 A1 | 5/2007 | |
| WO | 2011 009496 A1 | 1/2011 | |

OTHER PUBLICATIONS

Touching the Untouchables: Dynamic Security Analysis of the LTE Control Plane by Hongil Kim; Jiho Lee; Eunkyu Lee; Yongdae Kim Published in: 2019 IEEE Symposium on Security and Privacy (SP) Sep. 2019 (Year: 2019).*

PCT Notification of Transmittal of the International Search Report and the Written Opinion of the International Searching Authority, or the Declaration issued for International application No. PCT/EP2017/066162—dated Aug. 10, 2017.

Blockchain @ TELCO; How blockchain can impact the telecommunications industry and its relevance to the C-Suite; Blockchain Institute—Nov. 28, 2016.

DHSS—Distributed Peer-to-Peer implementation of the LTE HSS based on the Bitcoin/Namecoin architecture by Roger Piqueras Jover and Joshua Lackey—2016.

(56) References Cited

OTHER PUBLICATIONS

LTE Quick Reference; http://www.sharetechnote.com/html/Handbook_LTE_Authentication.html—Jun. 14, 2017.

* cited by examiner

METHOD AND DEVICES FOR HARDWARE IDENTIFIER-BASED SUBSCRIPTION MANAGEMENT

PRIORITY

This nonprovisional application is a U.S. National Stage Filing under 35 U.S.C. § 371 of International Patent Application Serial No. PCT/EP2017/066162 filed Jun. 29, 2017 and entitled "METHOD AND DEVICES FOR HARDWARE IDENTIFIER-BASED SUBSCRIPTION MANAGEMENT" which is hereby incorporated by reference in its entirety.

TECHNICAL FIELD

Embodiments of the subject matter disclosed herein generally relate to methods and network devices in the context of cellular subscription management, more specifically, to using a hardware identifier when a device connects to a cellular network instead of using an International Mobile Subscriber Identity, IMSI.

BACKGROUND

In cellular networks, dedicated nodes are employed in the process of connecting client devices (in this document named user equipment, UE). For example, in the 4G, 3G and 2G standards, UE authorization, authentication and accounting is performed by a Home Subscriber Server (HSS) or a Home Location Register/Authentication Center (HLR/AuC) node. Conventionally, UE authentication is based on an International Mobile Subscribed Identity (IMSI) stored in a UE Subscriber Identity Module (SIM) or a Universal Integrated Circuit Card (UICC). Currently, network operators (i.e., providers of cellular network services) buy IMSIs in bulk from the country regulator. The network operators serve any UE whose IMSI (in SIM/UICC) matches an IMSI in their list of served IMSIs.

The conventional centralized architectural approach has worked satisfactorily for a controlled number of users. However, with the coming of the Internet of Things (IoT), billions of devices will be using cellular (i.e., wireless) services, so this centralized approach is no longer suitable. At least two problems are foreseeable.

First are security and scalability concerns. The increase in control plane messaging toward subscription management and authentication nodes due to the larger number of connected devices makes rogue devices more likely to be able to flood the control plane traffic. Distributed approaches to this kind of nodes in cellular networks (as described in WO 2007/052894 A1, entitled, "Distributed HSS (Home Subscriber Server) Architecture," and in the article, "dHSS—distributed Peer-to-Peer implementation of the LTE HSS based on the bitcoin/namecoin architecture," by R. P. Jover and J. Lackey, published in 2016 *IEEE International Conference on Communications Workshops (ICC)*, Kuala Lumpur, 2016, pp. 354-359) try to mitigate this problem by distributing traffic and processing load and increasing security.

Second is an issue of subscription management complexity. In the IMSI-based approach, authentication of UE is based on a software-based IMSI stored a priori on the UE's SIM or UICC module. This requirement limits the UE authenticating to a home network operator in a specific region, and, outside the specific region, to a limited set of other network operators that have a roaming agreement with the home network operator. In the IoT context, this limitation leads to undesirable bottlenecks.

For example, given that UEs authenticate to specific cellular networks a priori determined, some mobile network operators become overloaded, even though there are other mobile network operators in the area with less network load that can accommodate additional UEs. In another undesirable scenario, some UEs may not be able to connect in areas where their home operator is not available, and where local mobile network operators do not have roaming agreements with the home operator.

In view of the above-identified weakness of IMSI-based approach, which problems will likely be amplified in the context of IoT, it has become apparent that improvements are desirable to overcome the foreseeable problems of this approach.

SUMMARY

In order to avoid the problems of the IMSI-based subscription management, the individual UE's unique hardware identifier is used to connect the UE to a cellular network. The subscription management and authentication nodes have a function that associates the unique hardware identifier to one of the IMSIs available from the list of IMSIs served by the network operator. The subscription management and authentication nodes of participating operators form a trusted network share the status of active IMSIs. In some embodiments, a private blockchain replaces the traditional subscription management functionalities such as trust IDs and distributed ID management, subscription lifecycle management, billing management, etc.

According to an embodiment, there is a method performed by a network device in a cellular network for enabling connecting devices to the cellular network using hardware identifiers uniquely assigned when the devices are manufactured. The method includes storing subscriber records, each subscriber record including a hardware identifier of a device, receiving a target hardware identifier of a target device that has requested to attach to the cellular network, and, if the subscriber records comprise a record including the target hardware identifier, associating an IMSI, to the target hardware identifier.

A network device in a cellular network configured to enable attaching devices to the cellular network using hardware identifiers uniquely assigned when the devices are manufactured. The network device includes a data storing unit that stores subscriber records, each subscriber record including a hardware identifier of a device. The network device further includes a processor connected to the data storing unit and configured to receive a target hardware identifier of a target device that has requested to attach to the network, and, if the subscriber records comprise a record including the target hardware identifier, to associate an IMSI to the target hardware identifier.

According to yet another embodiment there is a network device in a cellular network configured to enable attaching devices to the cellular network using hardware identifiers uniquely assigned when the devices are manufactured. The network device includes a first module that stores subscriber records, each subscriber record including at least a hardware identifier of a device, a second module configured to receive a target hardware identifier of a target device that has requested to attach to the cellular network, and a third module configured to associate an IMSI to the target hardware identifier, if the subscriber records comprise a record including the target hardware.

According to another embodiment there is a method performed by a device having a hardware identifier uniquely assigned when the device was manufactured. The method includes transmitting an attachment request for connecting to a cellular network, the attachment request including the hardware identifier of the device, receiving a reply to the attachment request, and engaging in a procedure for connecting the device to the cellular network using information included in the reply.

According to yet another embodiment there is a device having a hardware identifier uniquely assigned when the device was manufactured. The device includes a cellular interface configured to transmit an attachment request for connecting to a cellular network, the attachment request including the hardware identifier of the device, and to receive a reply related to the attachment request. The device further includes a processor configured to generate the attachment request and communications related to attaching the device to the cellular network using information included in the reply.

According to another embodiment there is a device having a hardware identifier uniquely assigned when the device was manufactured. The device includes a first module that transmits an attachment request for connecting to a cellular network, the attachment request including a hardware identifier of the device, a second module configured to receive a reply related to the attachment request, and a third module configured to engage in a procedure for attaching the device to the cellular network using information included in the reply.

According to another embodiment there is a method performed by a network node in a cellular network, for attaching devices to the cellular network using hardware identifiers uniquely assigned when the devices are manufactured. The method includes forwarding an attachment request including a hardware identifier of a device, to a network device able to verify whether the device is registered to use the cellular network. The method further includes initiating a procedure for connecting the device to the cellular network based on a response to the attachment request indicating an IMSI associated with the hardware identifier.

According to yet another embodiment there is a network node in a cellular network configured to intermediate attaching devices to the cellular network using hardware identifiers uniquely assigned when the devices are manufactured. The network node includes a transceiver configured to receive from a device and transmit to a network device an attachment request including a hardware identifier of a device, the network device being able to verify whether the device is registered in the cellular network. The network node further includes a processor configured to initiate a procedure for connecting the device to the cellular network based on a response to the attachment request indicating an IMSI associated with the hardware identifier.

According to yet another embodiment, there is a network node in a cellular network configured to intermediate attaching devices to the cellular network using hardware identifiers uniquely assigned when the devices are manufactured. The network node has a first module configured to forward an attachment request received from a target device to the cellular network, the attachment request including a hardware identifier of a device and the network device being able to verify whether the device is registered to be serviced by the cellular network. The network node also has a second module configured to initiate a procedure for connecting the device to the cellular network based on a response to the attachment request indicating that an IMSI is associated with the hardware identifier.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments are described in the context of a cellular network, but may be applied for wired/hybrid networks. The described node functionality may be executed in a cloud environment.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In various embodiments described in this section, the authentication request submitted by a UE to connect to a cellular network includes a hardware identity assigned to the UE by the manufacturer. The hardware identity may be, for example, the MAC address of a radio module or a UICC identifier. The network operator associates the UE's hardware identity with an IMSI, which is then used to complete the authentication process. The user registry information (i.e., the UE's hardware identifier and the associated IMSI) may be distributed to the subscription management nodes of the cellular network.

The use of the hardware identifier provides the advantage of decreasing subscription management complexity, which is one of the cost drivers for massive machine-type communication, such as for Narrowband IoT, 3GPP LTE-M, etc. Another advantage is that it does not require storage of device IMSIs, and a hardware identifier can be reused for authentication in different networks. Since a UE may connect to different cellular networks in its range, load may be better balanced across mobile network operators. Yet another advantage is that the hardware identifier-based approach may easily be implemented in a back-compatible manner for existing cellular networks (e.g., conforming to 3G or LTE standards).

Figure 1:
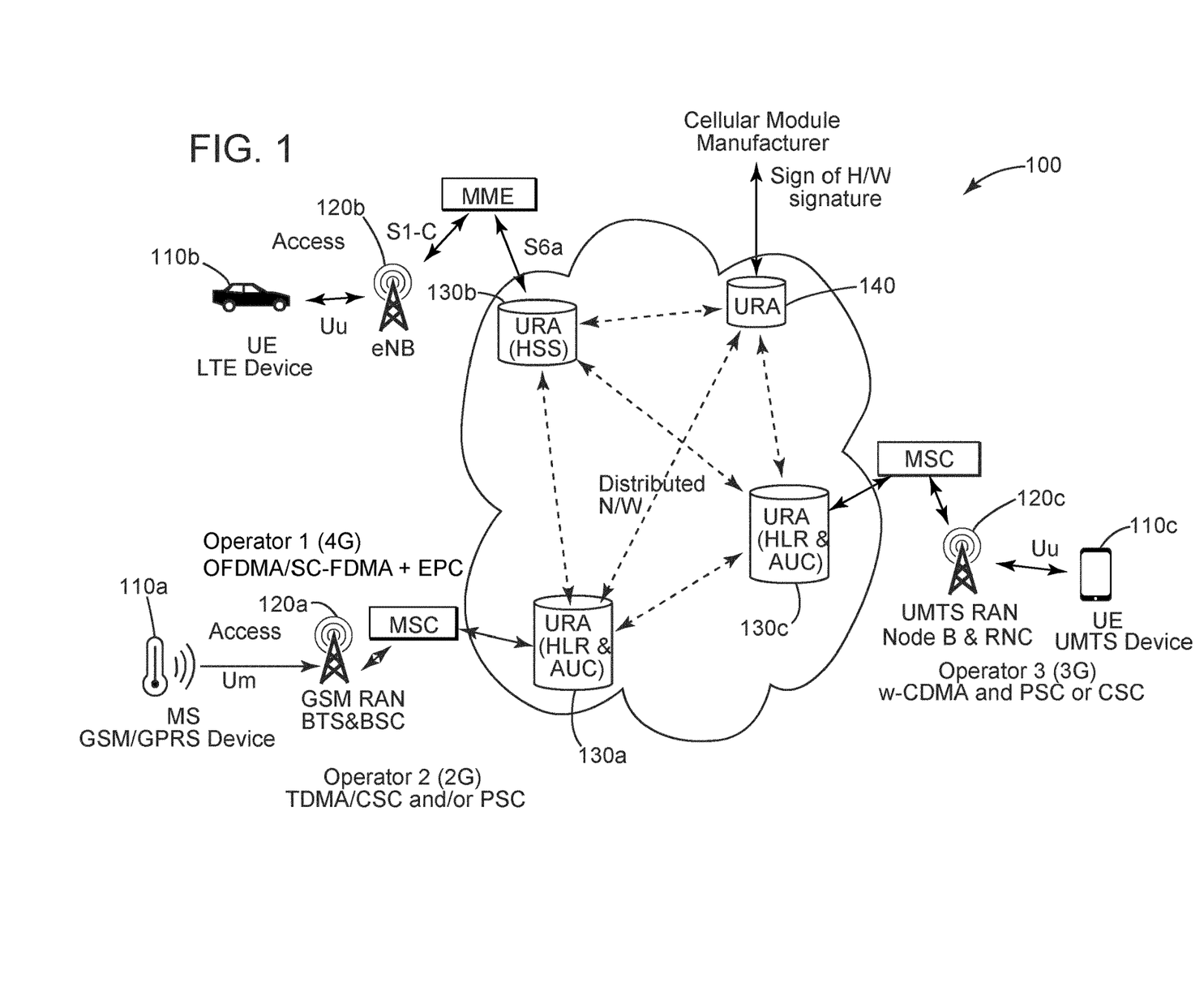
FIG. 1 illustrates a cellular network system which may include various embodiments.

FIG. 1 illustrates a cellular network system 100 in which various embodiments may be implemented. The term "cellular network" refers to a communication network where the UEs communicate wirelessly with the base stations. The following description uses standard terminology, but this terminology is illustrative and not intended to be limiting. The devices that perform methods according to the various embodiments may conform to any of multiple generations of mobile networks, for example, 2G, 3G and 4G, and for the still-developing 5G.

System 100 includes UEs 110a-c able to attach over the air to respective nodes 120a-c. User Registry and Authentication (URA) nodes 130a-c authenticate UEs. Logical 2G, 3G and 4G nodes have different names, and their functionality may be executed by more than one physical device. For example, in the case of an LTE network, the URA node is called the Home Subscriber Server (HSS), but in the case of a 2G or 3G network, it is called the Home Location Register (HLR), with an Authentication Center (AuC) function. HLR and AuC are usually co-located. Other functional entities (e.g., MME or MSC) located or not in distinct physical devices may operate between the nodes 120a-c and the URA nodes 130a-c.

A cellular module manufacturer entity, which has manufactured the communication module of UEs, assigns a unique hardware identifier to each UE. This hardware identifier can, for example, be the Media Access Control (MAC) address, and be stored in an URA 140.

Figure 2:
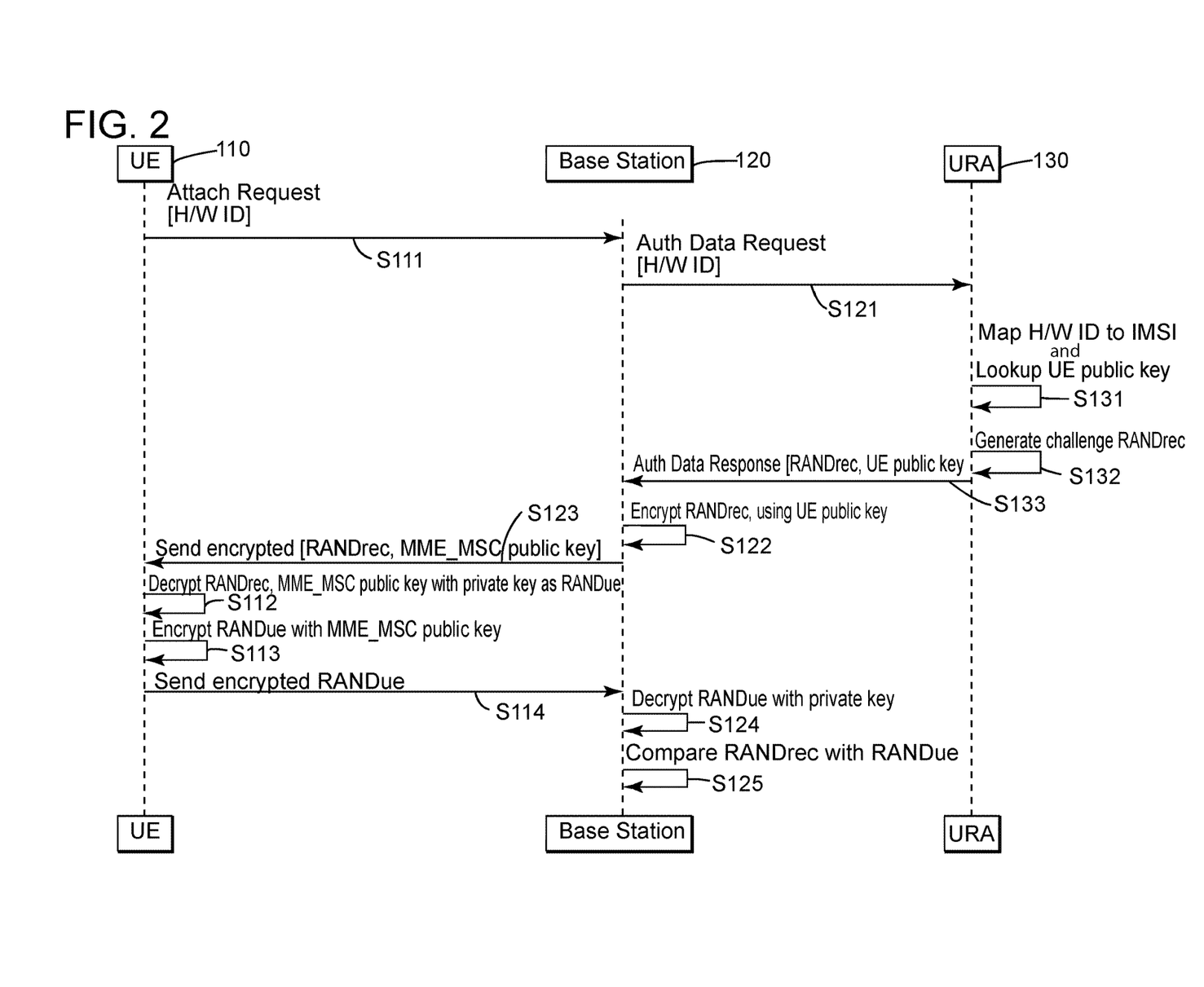
FIG. 2 illustrates a hardware identifier-based authentication according to an embodiment.

FIG. 2 illustrates an authentication process for UE 110 and employing a base station 120 (which may be any of the nodes 120a-c illustrated in FIG. 1) and a network device 130 (which may be any of the nodes 130a-c illustrated in FIG. 1, that may also host MME or MSC functionality).

Steps S111-S114 of the authentication process are performed by UE 110, steps S121-S125 by base station 120, and steps S131-134 by network device 130. At S111, UE 110 sends an attachment request including its hardware identifier to base station 120. Upon receiving this request, at S121, base station 120 sends an authorization data request including UE 110's hardware identifier to URA node 130.

URA node 130 associates UE 110's hardware identifier to an available IMSI and retrieves UE's public key at S131. The parameters received from base station 120 are used to generate a challenge at S132, which is transmitted together with the UE's public key to base station 120 at S133.

At S122, base station 120 encrypts the challenge using the UE's public key, and then sends the encrypted challenge and its public key to UE 110, at S123. It is assumed that the network and the UE knew UE's public key.

UE 110 decrypts the received encrypted message at S112, and then re-encrypts it using the base station's public key, at S113, to send the result to the base station at S114.

Upon receiving this second message from UE 110, the base station decrypts it at S124 and compares the result with the challenge at S125. If the comparison result is satisfactory, a standard authentication procedure using the IMSI may follow. Such standard authentication procedures are currently described, for example, at www.sharetechnote.com/html/Handbook_LTE_Authentication.html.

Figure 3:
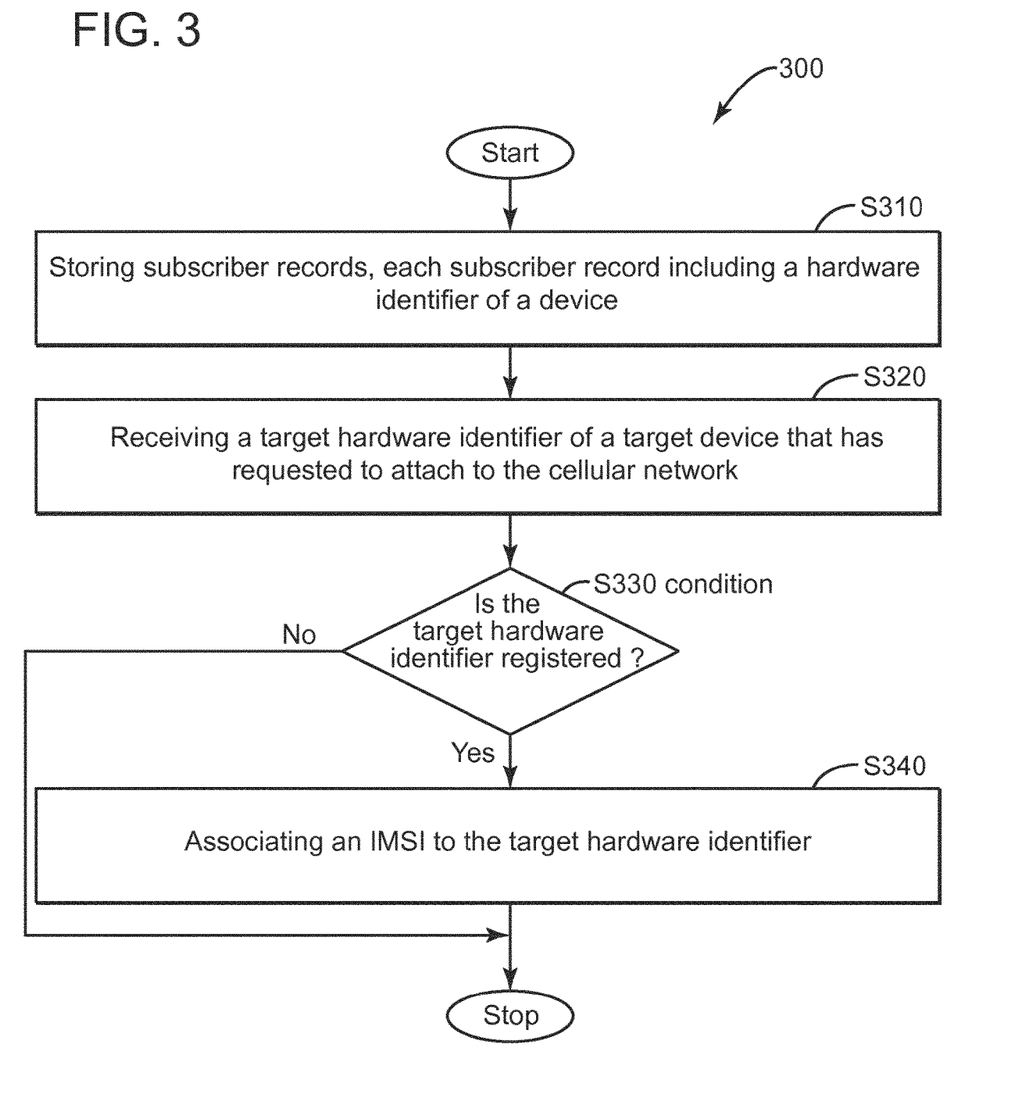
FIG. 3 is a flowchart of a method according to an embodiment.

FIG. 3 is a flowchart of a method 300 performed by a network device, such as URA 130, in a cellular network for connecting devices, such as UE 110, to the cellular network using hardware identifiers uniquely assigned when the UEs are manufactured. Method 300 includes storing subscriber records, with each subscriber record including the hardware identifier of a device at S310. The method further includes receiving a target hardware identifier of a target device that has requested to attach to the cellular network at S320. The method concludes at S330 by associating an IMSI to the subscriber identifier, if (see S330 condition) a record including the target hardware identifier is found among the subscriber records. In other words, S330 condition tests whether the hardware identifier has been registered.

The subscriber record may include an encryption key of the target device. The encryption key and the IMSI may be further used for attaching the target device to the cellular network.

Figure 4:
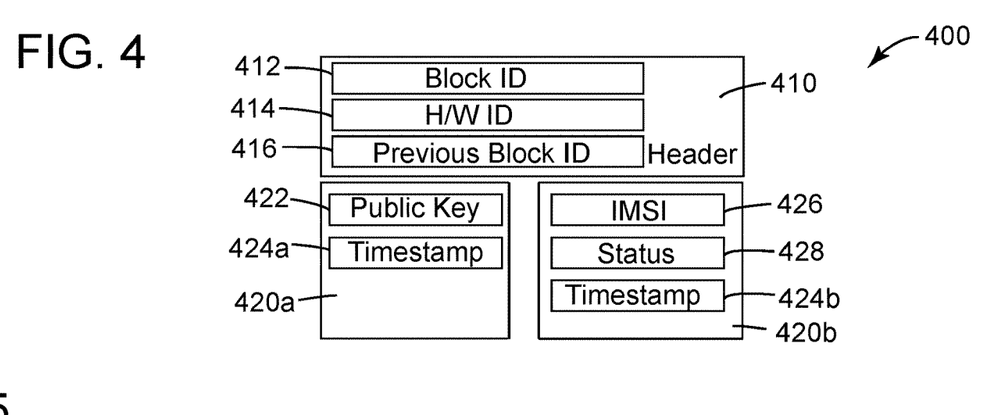
FIG. 4 illustrates structure of a block in a blockchain according to an embodiment.

In some embodiments, the method further includes storing one or more IMSI activation or deactivation blocks in a blockchain. A blockchain is a distributed database, maintaining a continuously growing list of ordered records called blocks. Once added to the list, a block cannot be removed or modified. A block may indicate registration of a device (i.e., it is a subscriber record), or a subsequent activation or deactivation of an IMSI mapped to a device by a mobile network operator. FIG. 4 illustrates a structure of a block 400 according to an embodiment. Block 400 includes a header with a block identified field 412, a hardware identifier field 414, and a previous block identifier field 416.

If block 400 is a subscriber record, then it includes subscriber information 420a, and if it is an activation/deactivation block, then it includes activation-related information 420b. Subscriber information 420a includes a UE public key field 422 and a time-stamp 424a. Activation-related information 420b includes an IMSI field 426, a status field 428 and a time-stamp 424b.

Figure 5:
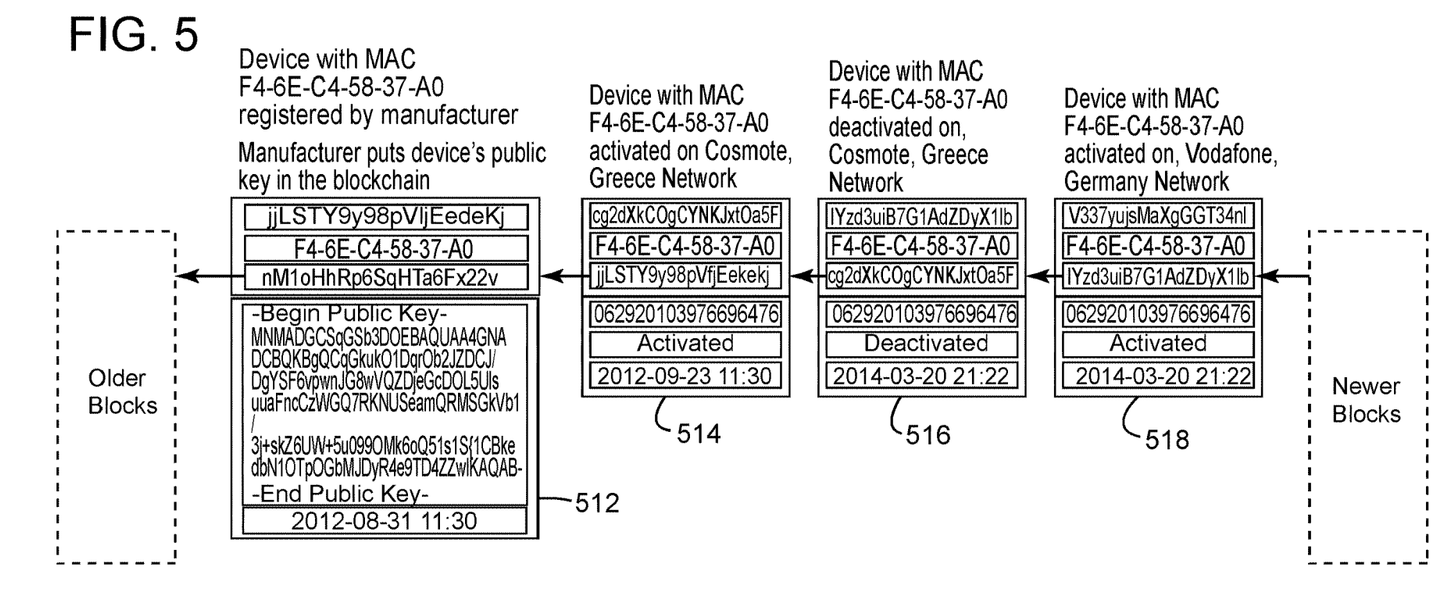
FIG. 5 illustrates a segment of a blockchain according to an embodiment.

FIG. 5 illustrates a portion of a blockchain 500, with block 512 being a subscriber record and blocks 514, 516 and 518 being activation/deactivation blocks. Thus, if the activation/deactivation block was added when an IMSI has been associated with a hardware ID, the status indication is "activated." If the activation/deactivation block was added when the UE has been disconnected, the status is "deactivated" and the respective IMSI is released becoming available to be reused by the network operator. Although, in FIG. 5, the subscriber records are included in the blockchain, this is optional; that is, in one embodiment the subscriber records are stored separately. All the blocks in FIG. 5 refer to the same UE (i.e., same hardware identifier), but in practice, the blocks may refer to a subset of (or all) network served UEs.

Selecting one of the IMSIs available to be associated by the network with a hardware identifier may be performed in different manners. The IMSI may be randomly selected, or the available IMSI may be stored as a first-in-first-out FIFO queue, which outputs the least-recently-used IMSI.

In one embodiment, the following mapping function may be used to select the IMSI using the hardware identifier. This mapping function selects the IMSI from an existing list of n available IMSIs $I_{OPER}=\{i_1, \ldots i_n\}$. The number n may vary. As previously mentioned a mobile network operator obtains IMSIs from a local regulator and at any time a subset of these IMSIs is used while the rest are available to be used. Returning to the mapping function, the hardware identifier to be mapped to an IMSI is an integer number, more specifically the IEEE 802 MAC addresses of 48-bit address space. Thus, the MAC address can have a decimal value between 0 (00-00-00-00-00-00) and 281,474,976,710,655 (FF-FF-FF-FF-FF-FF). Applying the modulo operation to the MAC address, MAC_Addr, yields a value $dec_{mAc}$ which is smaller than n:

$f(MAC\_Addr)=dec_{MAC}$ mod n.

For example, if n=1265 is the number of available IMSIs and MAC_Addr=68-26-D8-87-92-BA is UE's MAC address, since f(68-26-D8-87-92-BA)=114516050809530 mod 1265=95, then the 95$^{th}$ IMSI in the list is selected to be associated to this hardware identifier. If MAC_Addr=C6-99-97-B0-A5-E2, the 1109$^{th}$ IMSI is selected because f(C6-99-97-B0-A5-E2)=218362977232354 mod 1265=1109.

Figure 6:
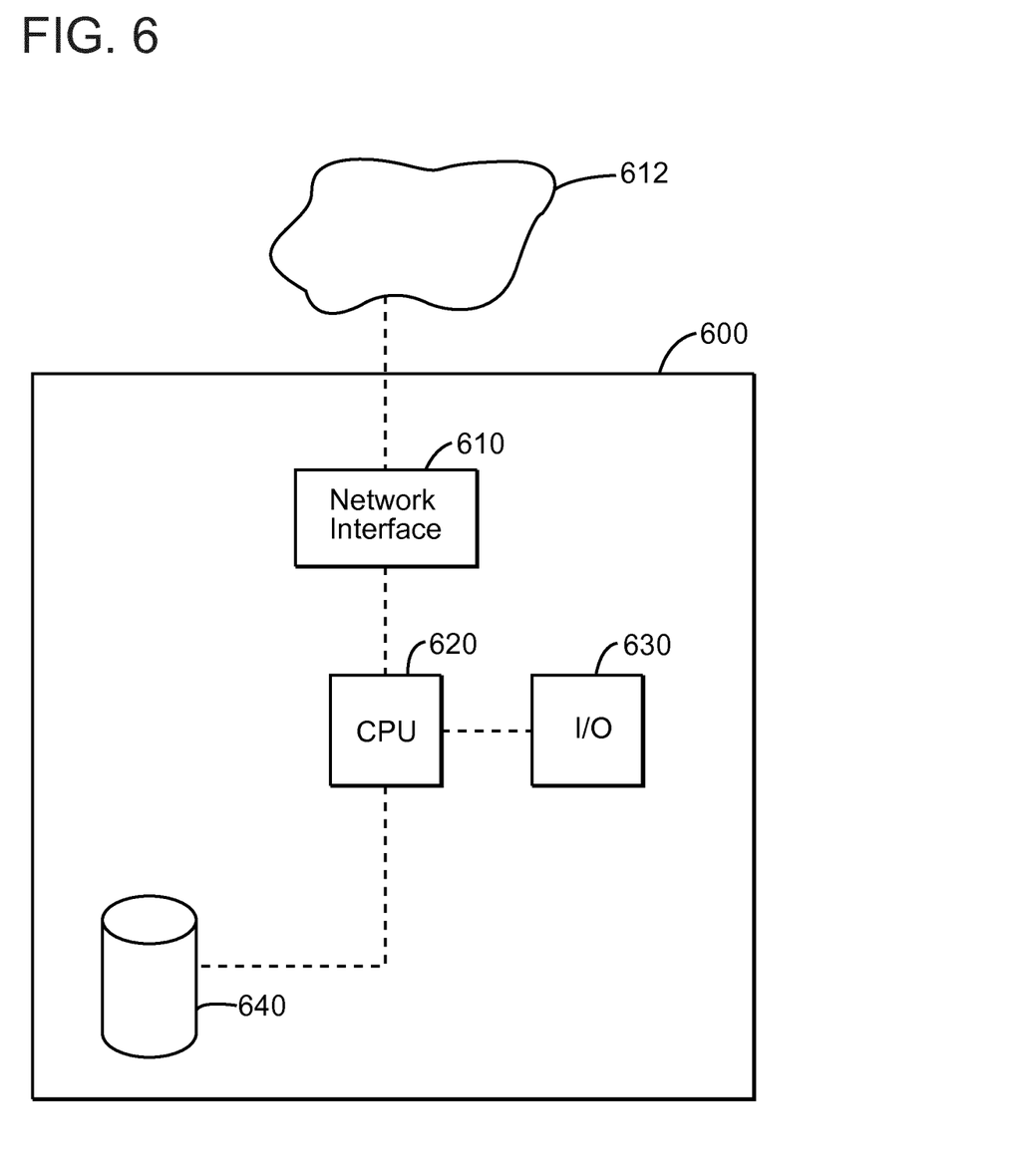
FIG. 6 is a block diagram of a cellular network device according to an embodiment.

FIG. 6 is a block diagram of a device 600 configured to perform at least some of the above-described methods. Device 600 is connected to network 612 via an interface 610. Device 600 further includes at least one processor 620, a data storage unit 640 and, optionally, a user interface 630. Data storage unit 640 stores subscriber records, each subscriber record including a hardware identifier of a device. Processor 620 is configured to receive a target hardware identifier of a target device that has requested to attach to the network, and, if the subscriber records comprise a record including the target hardware identifier, to associate an International Mobile Subscriber Identity, IMSI, to the target hardware identifier.

Figure 7:
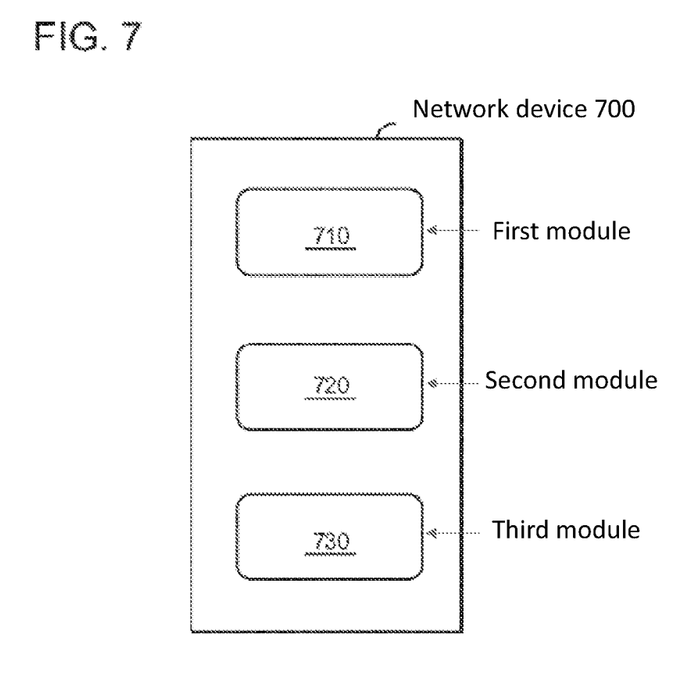
FIG. 7 is a device in a cellular network configured to enable hardware identifier-based attachment of devices according to an embodiment.

According to another embodiment, the above-described methods may be performed by a network device 700 in a cellular network as illustrated in FIG. 7. Network device 700 includes: a first module 710 that stores subscriber records, with each subscriber record including at least a hardware identifier of a device; a second module 720 configured to receive a target hardware identifier of a target device that has requested to attach to the cellular network; and a third module 730 configured to associate an IMSI to the target hardware identifier, if the subscriber records comprise a record including the target hardware. These modules may be a combination of hardware and software as required for performing the stated functions. These modules may be logical units placed in a distributed fashion across a network core.

Figure 8:
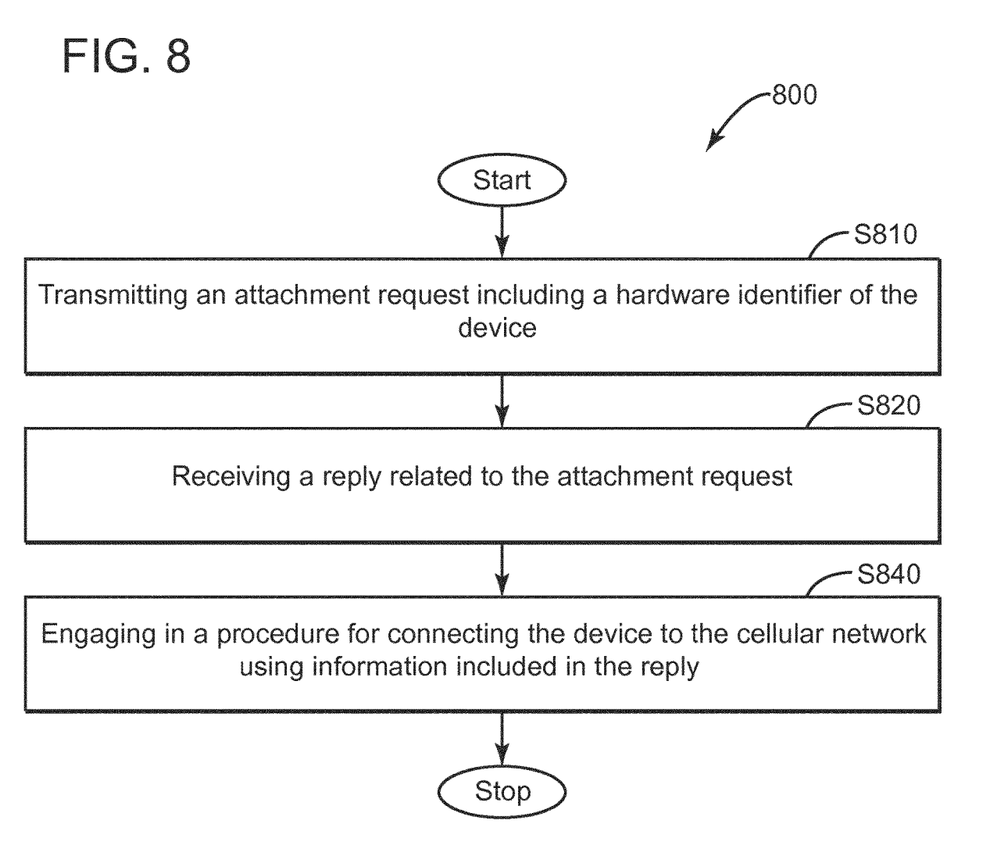
FIG. 8 is a flowchart of a method according to another embodiment.

FIG. 8 is a flowchart of a method 800 performed by a device (e.g., UE 110) having a hardware identifier uniquely assigned when manufactured. Method 800 includes transmitting an attachment request for connecting to a cellular network, with the attachment request including the hardware identifier of the device at S810, and receiving a reply related to the attachment request at S820. Method 800 further includes engaging in a procedure for connecting the device to the cellular network using information included in the reply at S830.

A device configured to perform method 800 may have a structure similar to the one illustrated in FIG. 6. If performing method 800, interface 610 is configured to transmit the attachment request for connecting to the cellular network 612, with the attachment request including the hardware identifier of the device, and to receive a reply related to the attachment request. Further, if performing method 800, processor 620 is configured to generate the attachment request and communications related to attaching the device to the cellular network using information included in the reply.

Figure 9:
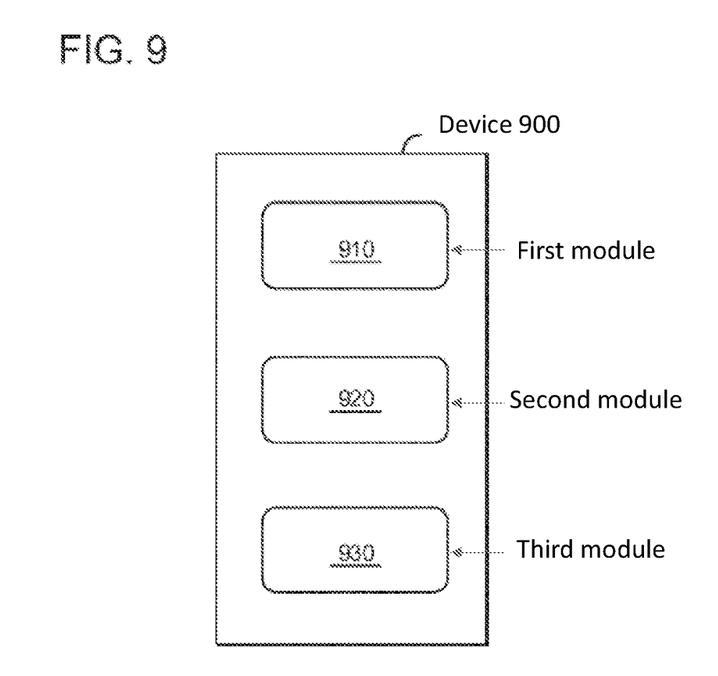
FIG. 9 is a device in a cellular network configured to enable hardware identifier-based attachment of devices according to another embodiment.

According to yet another embodiment illustrated in FIG. 9, a device 900 having a hardware identifier uniquely assigned when manufactured and able to perform method 800 includes: a first module 910 that transmits an attachment request for connecting to a cellular network, with the attachment request including a hardware identifier of the device; a second module 920 configured to receive a reply related to the attachment request; and a third module 930 configured to engage in a procedure for attaching the device to the cellular network using information included in the reply. The modules may be a combination of hardware and software as required for performing their functions.

Figure 10:
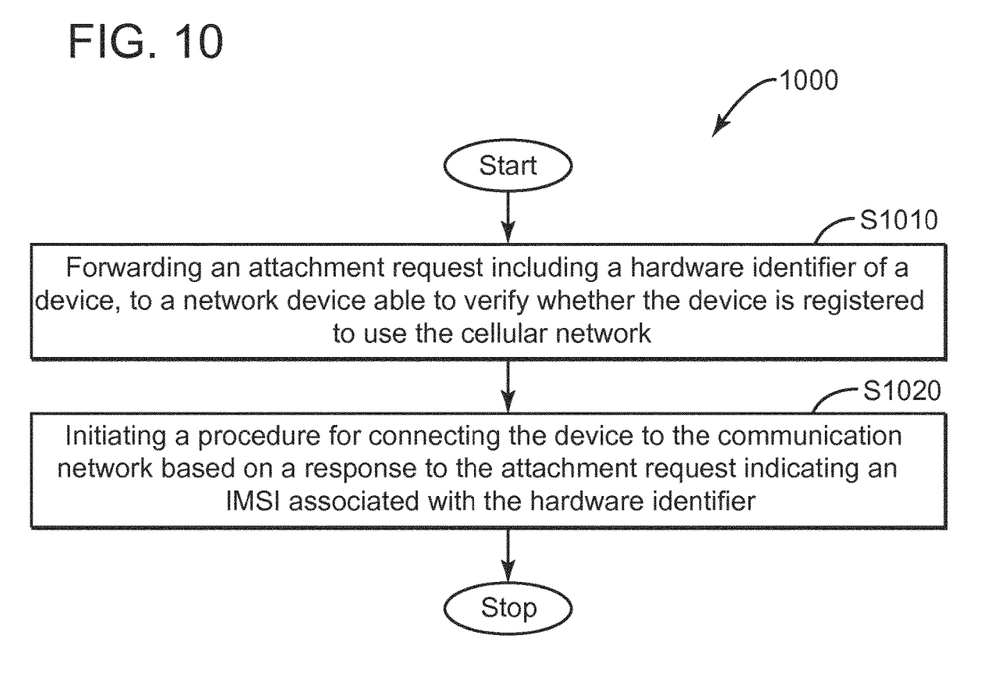
FIG. 10 is a flowchart of a method according to yet another embodiment.

FIG. 10 is a flowchart of a method 1000 performed by a network node, such as base station 120, for attaching UEs to a cellular network using hardware identifiers uniquely assigned when the UEs were manufactured. Method 1000 includes forwarding an attachment request, including a hardware identifier of a target UE, to a network device able to verify whether the UE is registered to use the cellular network at S1010. The method further includes initiating a procedure for connecting the UE to the cellular network based on a response to the attachment request indicating an IMSI associated with the hardware identifier at S1020.

A network node configured to perform method 1000 may have a structure similar to the one illustrated in FIG. 6. If performing method 1000, interface 610 is configured to receive from a device and transmit to a network device an attachment request including a hardware identifier of a device, the network device being able to verify whether the device is registered in the cellular network. Further, if performing method 1000, processor 620 is configured to initiate a procedure for connecting the device to the cellular network based on a response to the attachment request indicating an IMSI associated with the hardware identifier.

Figure 11:
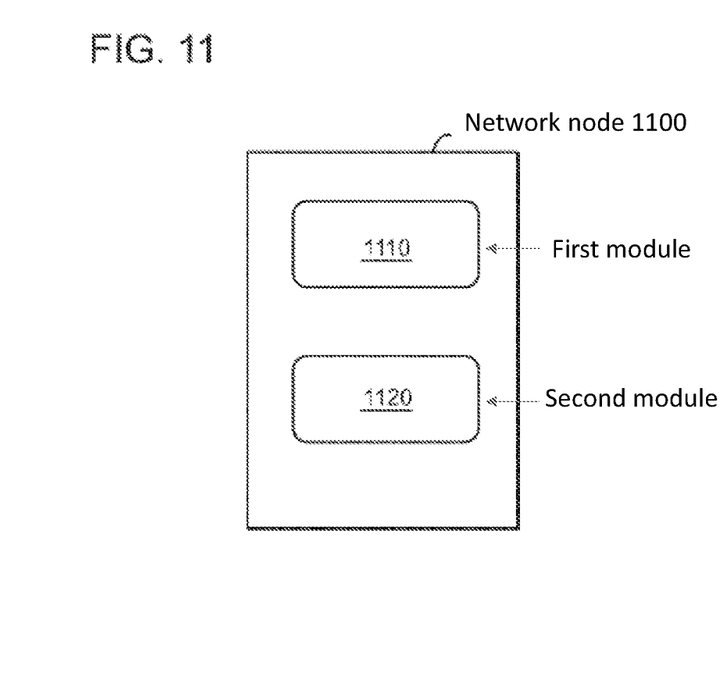
FIG. 11 is a network node configured to intermediate attaching devices to a cellular network according to another embodiment.

According to yet another embodiment illustrated in FIG. 11 there is a network node 1100 in a cellular configured to intermediate devices to the cellular network using hardware identifiers uniquely assigned when the devices are manufactured. Network node 1100 includes a first module 1110 configured to forward an attachment request received from a target device to the cellular network, the attachment request including a hardware identifier of a device and the network device being able to verify whether the device is registered to be serviced by the cellular network. Network node 1100 also includes a second module 1120 configured to initiate a procedure for connecting the device to the cellular network based on a response to the attachment request indicating an IMSI associated with the hardware identifier.

Other embodiments of the methods described in this section are computer programs with instructions that make a data processing unit carry out these methods, respectively. The executable codes of the computer programs may be stored on computer-readable recording media.

The embodiments disclosed in this section provide methods and network devices that enable using hardware identifiers when devices are connected to cellular networks. This description is not intended to limit the invention. On the contrary, the exemplary embodiments are intended to cover alternatives, modifications and equivalents, which are included in the scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments with particular combinations thereof, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a computer or a processor. This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A computer-implemented method performed by a network device in a cellular network, for enabling connecting devices to the cellular network using hardware identifiers uniquely assigned when the devices are manufactured, wherein the network device is not a User Equipment (UE) device, the method comprising:
    storing, in a data storage unit, subscriber records, each subscriber record including a hardware identifier of a device;
    receiving, at an interface of the network device, a target hardware identifier of a target device that has requested to attach to the cellular network;
    authenticating the target device for connecting to the cellular network based on the target hardware identifier, wherein authenticating the target device comprises:
        determining whether the subscriber records comprise a record including the target hardware identifier; and
        in response to determining that the subscriber records comprise the record including the target hardware identifier, associating an International Mobile Subscriber Identity, IMSI, to the target hardware identifier;
    storing one or more IMSI activation or deactivation blocks in a blockchain, each IMSI activation or deactivation block including the target hardware identifier, the IMSI or a previously used IMSI, a status indication and a time-stamp indicating when the IMSI or the previously used IMSI has been associated with the hardware identifier for the IMSI activation or deactivation block, wherein:
    when the IMSI is associated with the hardware identifier for an IMSI activation block, the network device is capable of writing "activated" in the status indication of the IMSI activation block, and
    when the previously used IMSI ceased being associated with the hardware identifier for an IMSI deactivation block, the network device is capable of writing "deactivated" in the status indication of the IMSI deactivation block.

2. The method of claim 1, wherein the record includes an encryption key of the target device, the encryption key and the IMSI being used in a process for attaching the target device to the cellular network.

3. The method of claim 1, wherein
    the record is included in the blockchain prior to any of the one or more IMSI activation or deactivation blocks, and/or
    the blockchain includes at least one IMSI activation block with another hardware identifier than the target hardware identifier.

4. The method of claim 1, wherein the associating includes mapping the target hardware identifier to one of available IMSIs of the cellular network, using one of
    applying a modulus function to the target hardware identifier,
    randomly selecting one of available IMSIs of the cellular network, and
    using the output of a first-in-first-out queue of the available IMSIs.

5. The method of claim 1, wherein the target hardware identifier is a Media Access Control, MAC, address of the target device.

6. A non-transitory computer readable recording media storing executable codes which, when executed by a network device in a cellular network make the network device to perform the method in claim 1 that enable attaching devices to the cellular network using hardware identifiers uniquely assigned when the devices are manufactured.

7. A computer-implemented network device in a cellular network configured to enable attaching devices to the cellular network using hardware identifiers uniquely assigned when the devices are manufactured, the network device comprising:
    a data storing unit that stores subscriber records, each subscriber record including a hardware identifier of a device; and
    a processor connected to the data storing unit and configured
    to receive, at an interface of the network device, a target hardware identifier of a target device that has requested to attach to the network, and
    to authenticate the target device for connecting to the cellular network based on the target hardware identifier, wherein to authenticate the target device comprises:
        to determine whether the subscriber records comprise a record including the target hardware identifier; and
        in response to determining that the subscriber records comprise the record including the target hardware identifier, to associate an International Mobile Subscriber Identity, IMSI, to the target hardware identifier;
    wherein the data storing unit also stores one or more IMSI activation or deactivation blocks in a blockchain, each IMSI activation or deactivation block including the target hardware identifier, the IMSI or a previously used IMSI, a status indication and a time-stamp indicating when the IMSI or the previously used IMSI has been associated with the hardware identifier for the IMSI activation or deactivation block, wherein
    when the IMSI is associated with the hardware identifier for an IMSI activation block, the processor is capable of writing "activated" in the status indication of the IMSI activation block, and
    when the previously used IMSI ceased being associated with the hardware identifier for an IMSI deactivation block, the processor is capable of writing "deactivated" in the status indication of the IMSI deactivation block.

8. The network device of claim 7, wherein the record includes an encryption key of the target device for attaching the target device to the cellular network.

9. The network device of claim 7, wherein
the record is included in the blockchain prior to any of the one or more IMSI activation or deactivation blocks, and/or
the blockchain includes at least one IMSI activation block with another hardware identifier than the target hardware identifier.

10. The network device of claim 7, wherein, when associating the IMSM to the hardware identifier, the processor maps the target hardware identifier to one of available IMSIs of the cellular network, the processor
applies a modulus function to the target hardware identifier,
randomly selects one of available IMSIs of the cellular network, or
uses an output of a first-in-first-out queue of the available IMSIs.

* * * * *